United States Patent Office 3,152,155
Patented Oct. 6, 1964

3,152,155
INSOLUBLE CHELATES OF DIVALENT TIN, GERMANIUM, AND LEAD
Horst G. Langer, Cochituate, Mass., assignor to The Dow Chemical Company, Midland, Mich., a corporation of Delaware
No Drawing. Filed Jan. 4, 1960, Ser. No. 72
7 Claims. (Cl. 260—429)

This invention relates to novel compounds of tin which may be characterized as the distannous chelates of certain synthetic alkylene polyamino acetic acid chelating agents and to the corresponding chelates of divalent lead and divalent germanium.

In certain industrial applications, it is desirable to have tin in the reduced divalent form. Situations of this type are in electroplating baths, dyeing compositions, and in the preparation of polymers. Compounds of this type are useful as catalysts and also as direct components of the polymer. Also in agricultural applications, where it is desirable to have a reservoir of the metal in the soil, the capacity for having tin present in its reduced form in an insoluble condition is a remarkable advantage in operations.

It is, accordingly, a fundamental object of this invention to provide a novel series of stannous compounds in insoluble form useful in all kinds of applications where the stannous form of tin is needed.

It is another object of the invention to provide a method for the preparation of these tin compounds.

Other objects and advantages of the invention will in part be obvious and in part appear hereinafter.

The invention, accordingly, is embodied in a sequence of tin, lead and germanium compounds which are characterizable as di-metal chelates of alkylenediamine acetic acid type chelating agents. More particularly, the structure of the compounds may be understood by reference to the following wherein the alkylene polyamino acetic acid portion of the molecule is formulated:

(HOOCCH$_2$)$_2$N.R wherein R is selected from the group consisting of H and —[(CH$_2$)$_n$N(CH$_2$COOH)]$_m$CH$_2$COOH, and the $n$ is an integer which is 2, 3 or 4, and $m$ is an integer having a value of 0, 1, 2, 3 or 4, and the alkali metal salts of such compounds. Thus the chelating agents corresponding to the formula can become iminodiacetic acid, nitrilotriacetic acid, ethylenediaminetetraacetic acid; trimethylenediaminetetraacetic acid; tetramethylenediaminetetraacetic acid; diethylenetriaminepentaacetic acid; triethylenetetraminehexaacetic acid; tetraethylenepentamineheptaacetic acid. As a variant of the alkylene polyamine chelating portion of the molecule, one or two of the acetic acid or carboxymethyl groups may be replaced by a β-hydroxyethyl group. Also those compounds in which the propionic acid group replaces the acetic acid group may be used.

The development of the formula of the compounds may be expressed as follows:

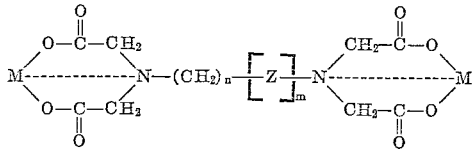

wherein Z is a moiety independently selected from the group consisting of

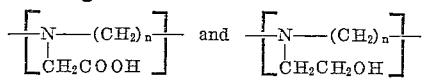

not more than two —CH$_2$CH$_2$OH groups appearing in the compound.

With ethylene diamine tetraacetic acid, the formula becomes:

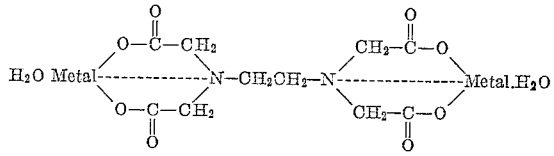

wherein the metal is bivalent tin, lead or germanium.

The practice of the invention and the properties of the compounds will be better understood by reference to the following examples which illustrate the method of formation of the compounds as related to their properties.

Example I $\frac{1}{100}$ mole of the disodium salt of ethylenediaminetetraacetic acid was dissolved in 20–50 milliliters of boiling water. This represents a moderately concentrated solution of the salt and has a pH of about 6. The aqueous solution is kept hot, at a temperature close to boiling, under an inert atmosphere, preferably nitrogen, and $\frac{2}{100}$ moles of solid stannous chloride is added with vigorous agitation. The inert atmosphere is maintained over the solution after all of the stannous chloride has dissolved and as the solution is allowed to cool. With cooling, the product, the di-stannous chelate, separates in crystalline form.

Na$_2$H$_2$EDTA+2SnCl$_2$→Sn·EDTA·Sn+2NaCl+2HCl

A more rapid crystallization of the product is obtained by the addition of some ethyl alcohol to the solution. In general, about 20–50 milliliters of the alcohol to make the liquid base approximately 50 percent water accomplishes this separation if it is desired.

Example II

Following the technique described in connection with Example I, trimethylenediaminetetraacetic acid was employed in place of the starting salt of Example I. The formation of the di-stannous chelate follows precisely the steps of Example I with separation of a good crystalline product.

Na$_2$H$_2$TMDTA+2SnCl$_2$→Sn·TMDTA·Sn
 +2NaCl+2HCl

Example III

Following the procedure of Example I, a starting salt of tetramethylenediaminetetraacetic acid was used and effective rapid separation of the crystalline di-stannous chelate was readily accomplished.

The preparation of the chelates follows this procedure quite directly and consistently the method gives a good yield, approximating the theoretical, of the metal chelate, the metal being in the reduced valence state.

As further examples of the synthesis, the bivalent salts of germanium, such as the chloride, and similarly, bivalent salts of lead such as the chloride and the nitrate are employed to form the corresponding metal chelate in the reduced valence state. The procedure is that of Example I.

In carrying out the preparations in accordance with the method of this invention, the temperature, while preferably maintained near the boiling stage, may be reduced from that level, provided all of the chelating agent is in solution. That is, complete solution and liquid phase for the reaction are the requirements. In general, the reaction is virtually instantaneous so that the time of reaction is merely that necessary to complete the addition of the salt and, thereafter, the natural cooling of the solution to practically ambient temperature.

The proportions of ingredients to be employed in the reaction should be, of course, based on the molar ratio desired, namely, two atoms of metal per atom of the ligand chelating agent. However, the reaction will proceed reasonably satisfactorily even though the ideal stoichiometric ratio is not maintained, so long as the concentration of reactants in the solution is sufficient to exceed the solubility of the product. Hence, the ratios of the two reactants can be varied within a generous factor away from the 2–1 molar ratio desired. In fact, the variation from the ideal can be made such that the excess of one or the other reagent may have as much as 10 times the stoichiometric requirement.

At about pH 5 the sodium salt of the metal chelate is formed, which has some degree of solubility. Generally, therefore, it is preferable to maintain the pH of the solution in which the product is formed below pH about 5, the complex is actually formed at pH as low as 1.

The tin compounds and the germanium and lead compounds of the ethylenediaminetetraacetic acid are crystalline solids, as are those of the trimethylenediaminetetraacetic acid, whereas the compounds of the tetramethylenediaminetetraacetic acid are microcrystalline in form. The compounds have a very slight degree of solubility in water, e.g., less than 1 part per 100 parts of water for the tin compounds. In all cases of the compounds prepared, melting points or decomposition temperatures were found to be higher than 300° C.

This form of the stannous tin, for example, gives a very strong degree of stabilization against oxidation to the higher valence state and where a supply of tin maintained stable in the stannous stage is necessary, this is a remarkable advantage of this compound. That is, in plating baths and similar applications, it finds substantial utility. For example to maintain a plating bath with a uniform concentration of the metal ions by using a saturated solution of the chelate and maintaining solid chelate in the bath as a reservoir. I have found also that by the addition of a bifunctional monomer compound such as ethylene glycol to the stannous tin, there is formed a polymeric material. The polymer and the tin compound itself are useful as anti-oxidants in compositions such as polypropylene.

Thus, the reservoir of the stannous ions in the form of the substantially insoluble tin chelates, provides a source of low level concentration of stannous ions in many applications such as biological situations, agricultural and electro plating uses. Also, where the lead compounds are prepared, it is quite apparent that they are useful in the compounding of plastic compositions suitable as X-ray shields.

Stannous fluoride has been reported to be useful in the compounding of dentifrices so that it can be available for typical use in prevention of dental caries. The tin chelates formed in accordance with this invention are more stable in wet compositions than the fluoride and are considerably less toxic than the stannous fluoride. Hence for topical applications in this field they are quite helpful in making possible preparation of wet dentifrices which have a long shelf life and in obviating the need for preparing fresh solutions for direct topical application.

Though the invention has been described in terms of forming a few specific examples, it is to be understood that variants thereof may be adopted without departing from its spirit or scope.

What is claimed is:
1. A solid crystalline metal chelate having a formula corresponding to the following:

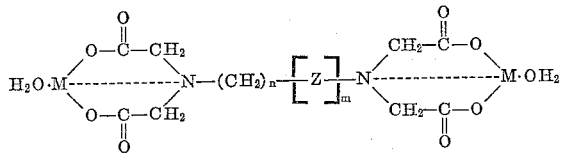

wherein M is a metal selected from the group consisting of tin, germanium and lead in the bivalent state, and wherein $n$ is an integer selected from the group consisting of 2, 3, 4 and $m$ is an integer selected from the group consisting of 0, 1, 2, 3; Z is a moiety independently selected from the group consisting of

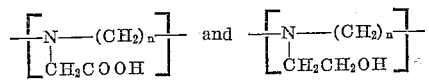

not more than two —$CH_2CH_2OH$ groups appearing in the compound.

2. A compound in accordance with claim 1, which is the di-stannous chelate of ethylene diamine tetraacetic acid.

3. A compound in accordance with claim 1 which is the di-stannous chelate of diethylene triamine pentaacetic acid.

4. A compound in accordance with claim 1 which is the di-germanium chelate of ethylene diamine tetraacetic acid, the germanium being in the bivalent state.

5. A compound in accordance with claim 1, which is the di-lead chelate of ethylene diamine tetraacetic acid, the lead being in the bivalent state.

6. A compound in accordance with claim 1 which is the di-stannous chelate of trimethylene diamine tetraacetic acid.

7. A compound in accordance with claim 1 which is the di-stannous chelate of tetramethylene diamine tetraacetic acid.

References Cited in the file of this patent

UNITED STATES PATENTS

| 2,583,891 | Schwarzenbach | Jan. 29, 1952 |
| 2,859,104 | Kroll | Nov. 4, 1958 |

FOREIGN PATENTS

| 896,335 | Germany | Nov. 12, 1953 |
| 791,119 | Great Britain | Feb. 26, 1958 |

OTHER REFERENCES

Martell et al.: "Chemistry of the Metal Chelate Compounds," Prentice-Hall, Inc. (1952), pages 537–541.

Martell et al.: "Chemistry of the Metal Chelate Compound," Prentice-Hall, Inc. (1952), pages 516 and 542.

Charberek et al.: "Organic Sequestering Agents," John Wiley and Sons, Inc. (1959), pages 126 and 127.

Brintzinger et al.: "Zeitschrift für Anorganische und allg. Chemie," vol. 251 (1943), pages 285–294.

Martell et al.: "Chemistry of the Metal Chelate Compounds," Prentice-Hall, Inc., 1952, pages 126, 598, 536–541 relied on.